United States Patent
Setton

(10) Patent No.: US 8,787,952 B2
(45) Date of Patent: Jul. 22, 2014

(54) SENDING A VIDEO RINGTONE

(71) Applicant: TangoMe, Inc., Palo Alto, CA (US)

(72) Inventor: Eric Setton, Menlo Park, CA (US)

(73) Assignee: TangoMe, Inc., Mountain View, CA (US)

( * ) Notice: Subject to any disclaimer, the term of this patent is extended or adjusted under 35 U.S.C. 154(b) by 0 days.

(21) Appl. No.: 13/631,314

(22) Filed: Sep. 28, 2012

(65) Prior Publication Data

US 2014/0094203 A1    Apr. 3, 2014

(51) Int. Cl.
*H04W 4/00* (2009.01)

(52) U.S. Cl.
USPC ........ 455/466; 455/567; 455/414.1; 455/415; 455/418

(58) Field of Classification Search
CPC ....... H04W 4/14; H04W 4/12; H04L 12/5895
USPC ........................ 455/466, 567, 414.1, 415, 418
See application file for complete search history.

(56) References Cited

U.S. PATENT DOCUMENTS

| | | | |
|---|---|---|---|
| 8,145,722 B2 | 3/2012 | Koons et al. | |
| 8,334,888 B2 | 12/2012 | Neuman et al. | |
| 2006/0111085 A1 | 5/2006 | Lee | |
| 2007/0136327 A1* | 6/2007 | Kim et al. | 707/100 |
| 2008/0167993 A1 | 7/2008 | Cue et al. | |
| 2008/0212943 A1 | 9/2008 | Frohlich et al. | |
| 2010/0057872 A1* | 3/2010 | Koons et al. | 709/206 |
| 2011/0010630 A1 | 1/2011 | Goldfarb et al. | |
| 2011/0051914 A1* | 3/2011 | Neuman et al. | 379/93.17 |
| 2012/0066355 A1 | 3/2012 | Tiwari et al. | |
| 2013/0052997 A1* | 2/2013 | Killick et al. | 455/412.1 |

OTHER PUBLICATIONS

PCT/US2013/061479 International Search Report and Written Opinion, Jan. 28, 2014, 11 pages.

* cited by examiner

*Primary Examiner* — Nghi H Ly

(57) ABSTRACT

A method for sending a video ringtone. The method includes: sending a call from a first communication device to a second communication device, wherein the call communicates a selectable video as a ringtone at the second communication device.

9 Claims, 2 Drawing Sheets

200

```
┌─────────────────────────────────────────────────────────────┐
│ SEND A CALL FROM A FIRST COMMUNICATION DEVICE TO A SECOND   │
│ COMMUNICATION DEVICE, WHEREIN THE CALL COMMUNICATES A       │
│ SELECTABLE VIDEO AS A RINGTONE AT THE SECOND                │
│ COMMUNICATION DEVICE                                        │
│ 205                                                         │
└─────────────────────────────────────────────────────────────┘
                              │
                              ▼
┌─────────────────────────────────────────────────────────────┐
│ RECEIVE A SELECTION OF THE SELECTABLE VIDEO FROM AN         │
│ OPERATOR OF THE FIRST COMMUNICATION DEVICE, WHEREIN THE     │
│ SELECTABLE VIDEO IS LOCATED AT A STORE OF SELECTABLE        │
│ VIDEOS                                                      │
│ 210                                                         │
└─────────────────────────────────────────────────────────────┘
                              │
                              ▼
┌─────────────────────────────────────────────────────────────┐
│ CHANGE AN AUDIO COMPONENT OF THE SELECTABLE VIDEO FOR       │
│ THE CALL IN RESPONSE TO AN AUDIO MODIFICATION INSTRUCTION   │
│ FROM AN OPERATOR OF THE FIRST COMMUNICATION DEVICE          │
│ 215                                                         │
└─────────────────────────────────────────────────────────────┘
                              │
                              ▼
┌─────────────────────────────────────────────────────────────┐
│ CHANGE A VISUAL COMPONENT OF THE SELECTABLE VIDEO FOR THE   │
│ CALL IN RESPONSE TO A VISUAL MODIFICATION INSTRUCTION FROM  │
│ AN OPERATOR OF THE FIRST COMMUNICATION DEVICE               │
│ 220                                                         │
└─────────────────────────────────────────────────────────────┘
                              │
                              ▼
┌─────────────────────────────────────────────────────────────┐
│ ASSOCIATE AN IDENTIFY OF THE SECOND COMMUNICATION DEVICE    │
│ WITH THE SELECTABLE VIDEO                                   │
│ 225                                                         │
└─────────────────────────────────────────────────────────────┘
```

FIG. 2

SENDING A VIDEO RINGTONE

BACKGROUND

In general, in a communication network, a phone registers an incoming call with an alert signal. The alert signal comes in various forms, such as auditory alerts (e.g., ringing), vibration patterns, and light patterns (e.g., identifying the number calling while flashing lights within the display). Generally, the operator of the phone receiving the incoming call controls the form of the alert signal.

BRIEF DESCRIPTION OF THE DRAWINGS

FIG. 2 is a flow diagram illustrating an example method for sending a video ringtone, in accordance with an embodiment.

Figure 1:
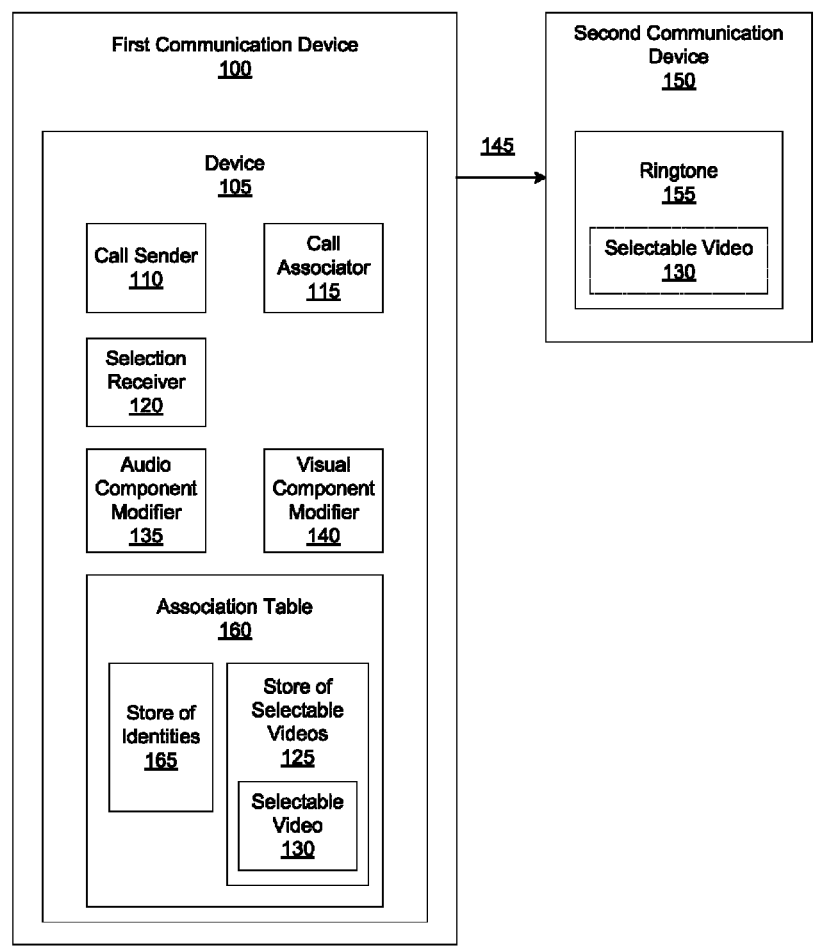
FIG. 1 is a block diagram illustrating an example device, in accordance with an embodiment.

The drawings referred to in this description should be understood as not being drawn to scale except if specifically noted.

DESCRIPTION OF EMBODIMENTS

Various embodiments are described below, with reference to detailed illustrative embodiments, in the context of device for sending a video ringtone. It will be apparent from the description provided herein that the systems, apparatuses and methods can be embodied in a wide variety of forms. Consequently, the specific structural and functional details disclosed herein are representative and do not limit the scope of embodiments of the present technology.

Example devices and methods for sending a video ringtone from a first communication device to a second communication device are described herein.

In particular, the following discussion will first describe the structure and components of the device. Then the discussion will describe the functionality of the structure and components of the device during use of the device.

FIG. 1 shows a block diagram illustrating a device 105 coupled with a first communication device 100, according to an embodiment. In one embodiment, the device 105 includes a call sender 110, a call associator 115, a selection receiver 120, an audio component modifier 135, and a visual component modifier 140.

In one embodiment, the call sender 110 sends a call 145 from the first communication device 100 to a second communication device 150, wherein the call 145 communicates a selectable video 130 as a ringtone at the second communication device 150. In one embodiment, the first communication device 100 and/or the second communication device 150 is a mobile phone. However, it should be appreciated that the first communication device 100 and/or second communication device 150 may be any device capable of receiving and transmitting communication to another device. The term communication refers to any type of message sent from one communication device to another, such as, but not limited to, texts, voicemails and emails.

In one embodiment, the call associator 115 is coupled with the call sender 110. The call associator 115 associates an identity of the second communication device 150 with the selectable video 130 based on an association table 160. For example, once the operator of the first communication device 100 signals that communication is being made to the second communication device 150, the device 105 acknowledges the intended location of the call (e.g., the phone number of the second communication device 150) and consults the association table 160 to determine the selectable video that corresponds to a specific identity. The association table 160 shows a predetermined relationship between acknowledged identities that are stored in a store of identities 165 and selectable videos that are stored in a store of selectable videos 125. More particularly and according to the above described example, the association table 160 shows the selectable video 130 that corresponds to the identity of the second communication device 150. The identity of the second communication device 150 that is acknowledged by the device 105 may be, but is not limited to, a phone number, email address, name, etc. of the second communication device 150.

In one embodiment, the selection receiver 120 is coupled with the call sender 110. The selection receiver 120 receives a selection of the selectable video 130 from an operator of the first communication device 100, wherein the selectable video 1300 is located at the device 105 in a store of selectable videos 125. For example, an operator (e.g., caller using the first communication device 100) of the first communication device 100 selects a video of himself sky diving as the selectable video 130 to be displayed on the second communication device's 150 display screen once the second communication device 150 receives the call 145.

In one embodiment, the selectable video 130 is a video recorded by the first communication device 100. In another embodiment, the selectable video is a video downloaded by the first communication device 100. In yet another embodiment, the selectable video is a pre-installed video on the first communication device 100. For example, but not limited to such example, the selectable video may be pre-installed at the time of the manufacturing of the first communication device 100, or even by the dealer of the first communication device 100.

In one embodiment, the audio component modifier 135 is coupled with the call sender 110. The audio component modifier 135 changes an audio component of the selectable video 130 for the call 145 in response to an audio modification instruction from an operator of the first communication device 100. The audio modification instruction may be, but is not limited to, increasing and/or decreasing the volume of the video, and muting the audio component. Thus, in one example, an operator of the first communication device 100 may instruct that when the selectable video 130 is displayed on the display of the second communication device 150, the audio is muted such that no sound accompanies the video.

In one embodiment, the visual component modifier 140 is coupled with the call sender 110. The visual component modifier 140 changes a visual component of the selectable video 130 for the call 145 in response to a visual modification instruction from an operator of the first communication device 100. The visual modification instruction may be, but is not limited to, increasing and/or decreasing the speed of play of the video, increasing and/or decreasing the brightness of the video. Thus, in one example, an operator of the first communication device 100 may instruct that when the selectable video 130 is displayed on the display of the second communication device 150, the video is playing at twice the rate of speed as was originally recorded.

The discussion will now describe the functionality of the structure and components of the device 105 during use of the device 105. In particular, the discussion will describe sending a video ringtone. The discussion will refer to FIGS. 1 and 2. FIG. 2 is a flow diagram illustrating an example method for sending a video ringtone. In various embodiments, method 200 is carried out by processors and electrical components under the control of computer readable and computer executable instructions. The computer readable and computer executable instructions reside, for example, in a non-transitory data storage medium such as computer usable volatile and non-volatile memory. However, the computer readable and computer executable instructions may reside in any type of computer readable storage medium. In some embodiments, method 200 is performed by components in device 105, as described in FIG. 1.

At operation 205 and as described herein, in one embodiment, a call 145 is sent from the first communication device 100 to the second communication device 150, wherein the call communicates the selectable video 130 as a ringtone at the second communication device 150.

At operation 210 and as described herein, in one embodiment, a selection of the selectable video 130 is received from an operator of the first communication device 100, wherein the selectable video 130 is located at the store of selectable videos 125.

At operation 215 and as described herein, in one embodiment, an audio component of the selectable video 130 is changed for the call 145 in response to an audio modification instruction from an operator of the first communication device 100.

At operation 220 and as described herein, in one embodiment, a visual component of the selectable video 130 is changed for the call 145 in response to a visual modification instruction from the operator of the first communication device 100.

At operation 225 and as described herein, in one embodiment, an identity of the second communication device 150 is associated with the selectable video 130.

Various embodiments of the present invention are thus described. While the present invention has been described in particular embodiments, it should be appreciated that the present invention should not be construed as limited by such embodiments, but rather construed according to the following claims.

I claim:

1. A computer-implemented method for sending a video ringtone, said computer-implemented method comprising:
receiving an indication that a call is being made from a first communication device to a second communication device;
acknowledging an intended location of said call;
consulting an association table at said first communication device, wherein said association table relates a set of selectable videos to an identity associated with said second communication device;
receiving, at a first communication device, a selection of a selectable video of said set of selectable videos, wherein said set of selectable videos is located at a store of selectable videos at said first communication device;
sending said call from said first communication device to said second communication device, wherein said call communicates a selected video of said selection of said selectable video as a ringtone at said second communication device.

2. The computer-implemented method of claim 1, further comprising:
changing an audio component of said selected video for said call in response to an audio modification instruction from an operator of said first communication device.

3. The computer-implemented method of claim 1, further comprising:
changing a visual component of said selected video for said call in response to a visual modification instruction from an operator of said first communication device.

4. A first communication device comprising a device, said device comprising:
a call associator configured for associating an identity of a second communication device with a set of selectable videos based on an association table located at said first communication device, wherein said association table relates said set of selectable videos to said identity, and wherein before said associating occurs, said device receives an indication that a call communication is being made from said first communication device to said second communication device, said device acknowledges an intended location of said call communication, and said device consults said association table;
a selection receiver coupled with said call associator, said selection receiver configured for receiving a selection of a selectable video of said set of selectable videos, wherein said set of selectable videos is located at a store of selectable videos at said communication device; and
a call sender configured for sending said call from said first communication device to said second communication device, wherein said call communicates said selection of said selectable video as a ringtone at said second communication device.

5. The device of claim 4, further comprising:
an audio component modifier coupled with said call sender, said audio component modifier configured for changing an audio component of said selected video for said call in response to an audio modification instruction from an operator of said first communication device.

6. The device of claim 4, further comprising:
a visual component modifier coupled with said call sender, said visual component modifier configured for changing a visual component of said selected video for said call in response to a visual modification instruction from an operator of said first communication device.

7. The device of claim 4, wherein said selectable video comprises:
a video recorded by said first communication device.

8. The device of claim 4, wherein said selectable video comprises:
a video downloaded by said first communication device.

9. The device of claim 4, wherein said selectable video comprises:
a pre-installed video on said first communication device.

* * * * *